(12) United States Patent
Choi et al.

(10) Patent No.: US 11,551,639 B2
(45) Date of Patent: Jan. 10, 2023

(54) DISPLAY DEVICE INCLUDING A LIGHT TRANSMISSION REGION, AND ELECTRONIC DEVICE

(71) Applicant: Samsung Display Co., Ltd., Yongin-si (KR)

(72) Inventors: Bo-Kyung Choi, Seongnam-si (KR); Youngseok Kim, Seoul (KR); Han-Na Ma, Suwon-si (KR); Dong-Yeol Yeom, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/143,948

(22) Filed: Jan. 7, 2021

(65) Prior Publication Data

US 2021/0241719 A1 Aug. 5, 2021

(30) Foreign Application Priority Data

Jan. 30, 2020 (KR) ........................ 10-2020-0011202

(51) Int. Cl.
| | |
|---|---|
| *G09G 5/10* | (2006.01) |
| *G09G 3/20* | (2006.01) |
| *G06V 40/16* | (2022.01) |
| *H04N 5/225* | (2006.01) |
| *G09G 3/3208* | (2016.01) |

(52) U.S. Cl.
CPC ............. *G09G 5/10* (2013.01); *G09G 3/2003* (2013.01); *G09G 3/2007* (2013.01); *H04N 5/2257* (2013.01); *G06V 40/16* (2022.01); *G09G 3/3208* (2013.01); *G09G 2300/0439* (2013.01);

(Continued)

(58) Field of Classification Search
CPC ...... G09G 5/10; G09G 3/2003; G09G 3/2007; G09G 3/3208; G09G 2300/0439; G09G 2300/0452; G09G 2320/0606; G09G 2320/0686; G09G 2320/0626; G09G 2340/0428; G09G 2310/0232; G09G 2360/144; G06K 9/00221; H04N 5/2257; H01L 27/3216; G06V 40/16
See application file for complete search history.

(56) References Cited

U.S. PATENT DOCUMENTS

| | | | |
|---|---|---|---|
| 2012/0200485 A1* | 8/2012 | Uchibe | G09G 3/3426 |
| | | | 345/102 |
| 2017/0270841 A1* | 9/2017 | An | G09G 5/005 |

(Continued)

FOREIGN PATENT DOCUMENTS

| | | |
|---|---|---|
| CN | 109872670 A | 6/2019 |
| JP | 2008-158399 A | 7/2008 |

(Continued)

*Primary Examiner* — Brent D Castiaux
(74) *Attorney, Agent, or Firm* — Lewis Roca Rothgerber Christie LLP

(57) ABSTRACT

A display device includes a display panel having a display region, and including a light transmission region overlapping an electronic element within an edge portion of the display region, and a panel driver configured to drive the display panel, and configured to perform an edge-dimming operation that gradually decreases a luminance of an area of the display region excluding the light transmission region from a center portion of the display region to the edge portion of the display region while not decreasing a luminance of the light transmission region.

20 Claims, 16 Drawing Sheets

(52) U.S. Cl.
CPC ............... *G09G 2320/0606* (2013.01); *G09G 2320/0686* (2013.01); *G09G 2340/0428* (2013.01)

(56) References Cited

U.S. PATENT DOCUMENTS

| | | | |
|---|---|---|---|
| 2018/0005606 A1* | 1/2018 | Mori | G09G 3/3413 |
| 2018/0122283 A1* | 5/2018 | Kim | G09G 3/2074 |
| 2019/0252475 A1* | 8/2019 | Sung | H04N 5/2257 |
| 2020/0111401 A1* | 4/2020 | Zhao | G09G 3/2003 |
| 2020/0310210 A1* | 10/2020 | Zhang | H01L 27/3232 |

FOREIGN PATENT DOCUMENTS

| | | |
|---|---|---|
| KR | 10-2016-0130042 A | 11/2016 |
| KR | 10-2017-0108182 A | 9/2017 |
| KR | 10-1924916 B1 | 12/2018 |

\* cited by examiner

| DIMMING LEVEL | | NO | 10% | 20% |
|---|---|---|---|---|
| POWER CONSUMPTION | LOGIC | 2.1W | 2.1W | 2.1W |
| | PANEL | 5.3W | 4.8W | 4.3W |
| | TOTAL | 7.4W | 6.9W | 6.4W |

| DISTANCE FROM CP (mm) | 70% EDGE DIMMING | 50% EDGE DIMMING |
|---|---|---|
| 0 | 400 | 400 |
| 0.5 | 399 | 398 |
| 1 | 398 | 397 |
| 1.5 | 397 | 395 |
| ... | ... | ... |
| MDIS-1.5 | 283 | 205 |
| MDIS-1 | 282 | 203 |
| MDIS-0.5 | 281 | 202 |
| MDIS | 280 | 200 |

DISPLAY DEVICE INCLUDING A LIGHT TRANSMISSION REGION, AND ELECTRONIC DEVICE

CROSS-REFERENCE TO RELATED APPLICATION(S)

This application claims to, and the benefit of, Korean Patent Application No. 10-2020-0011202, filed on Jan. 30, 2020 in the Korean Intellectual Property Office (KIPO), the disclosure of which is incorporated herein by reference in its entirety.

BACKGROUND

1. Field

Embodiments of the present disclosure relate to a display device including a light transmission region, and an electronic device including the display device.

2. Description of the Related Art

A portable electronic device, such as a laptop computer, a smart phone, etc., may include an electronic element, such as a camera module, a sensor module, etc., which senses external light to provide various services. Generally, for sensing the external light by the electronic element, a hole should be formed at a frame or a bezel of the portable electronic device. Thus, in a case where the electronic element is located at a front surface of the portable electronic device, the bezel of the portable electronic device may be enlarged, and a screen ratio may be reduced.

Recently, to increase the screen ratio, or a screen-to-body ratio (STBR), a technique that forms a hole for the electronic element within a display region of a display panel of the portable electronic device has been developed. For example, this technique may be referred to as a hole in active area (HIAA) technique. However, in this HIAA technique, an image cannot be displayed at the hole within the display region.

SUMMARY

Some embodiments of the present disclosure provide a display device that includes a light transmission region for an electronic element within a display region, and that is capable of displaying an image at the entire display region including the light transmission region. Further, some embodiments provide an electronic device including the display device.

According to some embodiments, there is provided a display device including a display panel having a display region, and including a light transmission region overlapping an electronic element within an edge portion of the display region, and a panel driver configured to drive the display panel, and configured to perform an edge-dimming operation that gradually decreases a luminance of an area of the display region excluding the light transmission region from a center portion of the display region to the edge portion of the display region while not decreasing a luminance of the light transmission region.

The panel driver may include an edge-dimming-data converter configured to gradually decrease gray levels of image data for the area of the display region as a distance from the center portion increases, and configured to maintain image data for the light transmission region.

The panel driver may further include an edge-dimming-parameter storage configured to store an edge-dimming-luminance parameter representing a ratio of a luminance of the edge portion to a luminance of the center portion, wherein the edge-dimming-data converter is configured to decrease the gray levels of the image data based on the edge-dimming-luminance parameter stored in the edge-dimming-parameter storage.

The edge-dimming-luminance parameter stored in the edge-dimming-parameter storage may be configured to be changed by a user setting.

The panel driver may be further configured to perform a light-transmission-region-compensation operation to increase the luminance of the light transmission region.

The panel driver may include an edge-dimming-data converter configured to gradually decrease gray levels of image data for the area of the display region as a distance from the center portion increases, and to increase gray levels of image data for the light transmission region.

The panel driver may further include an edge-dimming-parameter storage configured to store an edge-dimming-luminance parameter representing a ratio of a luminance of the edge portion to a luminance of the center portion, and configured to store a light-transmission-region-compensation parameter representing a luminance-increasing rate of the light transmission region, wherein the edge-dimming-data converter is configured to decrease the gray levels of the image data for the area of the display region based on the edge-dimming-luminance parameter, and is configured to increase the gray levels of the image data for the light transmission region based on the light-transmission-region-compensation parameter.

The edge-dimming-luminance parameter and the light-transmission-region-compensation parameter may be configured to be changed by a user setting.

A resolution of the light transmission region may be equal to a resolution of the area of the display region.

Each first pixel in the area of the display region may include first light-emitting regions configured to emit lights having different colors, wherein each second pixel in the light transmission region includes second light-emitting regions configured to emit lights having the different colors, and a light-transmitting window configured to transmit external light such that the external light reaches the electronic element.

A size of the second light-emitting regions may be smaller than a size of the first light-emitting regions.

A resolution of the light transmission region may be less than a resolution of the area of the display region.

N first pixels may be in the area of the display region, N being an integer that is greater than 0, wherein M second pixels are in the area of the light transmission region, M being an integer that is greater than 0 and less than N.

The display device may further include a light-transmitting window for transmitting external light in the light transmission region such that the external light reaches the electronic element.

The first pixels and the second pixels may be arranged in a PENTILE® structure (PENTILE® is a registered trademark owned by Samsung Display Co., Ltd.).

According to some embodiments, there is provided an electronic device including a display device including a display device including a display panel having a display region and a light transmission region within an edge portion of the display region, and a panel driver configured to drive the display panel, and an electronic element overlapping the light transmission region, wherein the panel driver is configured to perform an edge-dimming operation that gradually decreases a luminance of an area of the display region from a center portion of the display region to the edge portion of the display region while maintaining a luminance of the light transmission region.

The electronic element may include a camera module.

The electronic element may include a face recognition sensor module, a proximity sensor module or a motion sensor module.

The electronic device may include a laptop computer.

The electronic device may include a smart phone or a tablet computer.

As described above, in a display device and an electronic device according to some embodiments of the present disclosure, a display panel may include a light transmission region located to overlap an electronic element within an edge portion of a display region, and a panel driver may perform an edge-dimming operation that gradually decreases a luminance of the display region other than the light transmission region from a center portion of the display region to the edge portion of the display region while not reducing a luminance of the light transmission region. Accordingly, because the light transmission region for the electronic element is located within the display region, a screen ratio, or a screen-to-body ratio (STBR) of the display panel may be improved. Further, because the edge-dimming operation is performed, power consumption of the display device may be reduced, and a boundary of the light transmission region may not be perceived.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
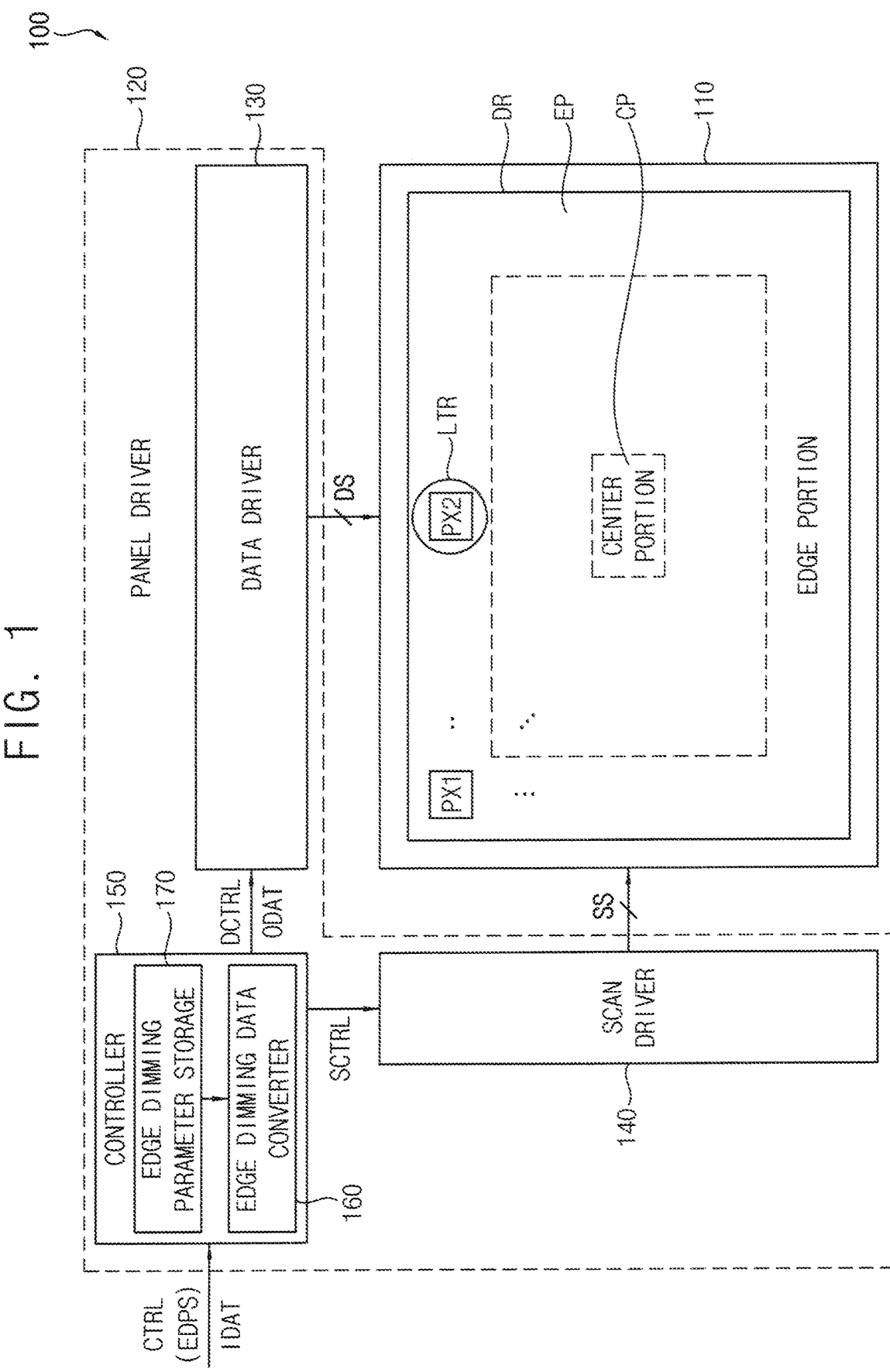
FIG. 1 is a block diagram illustrating a display device according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In this specification, the phrase "on a plane," or "plan view," means viewing a target portion from the top, and the phrase "on a cross-section" means viewing a cross-section formed by vertically cutting a target portion from the side.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2A:
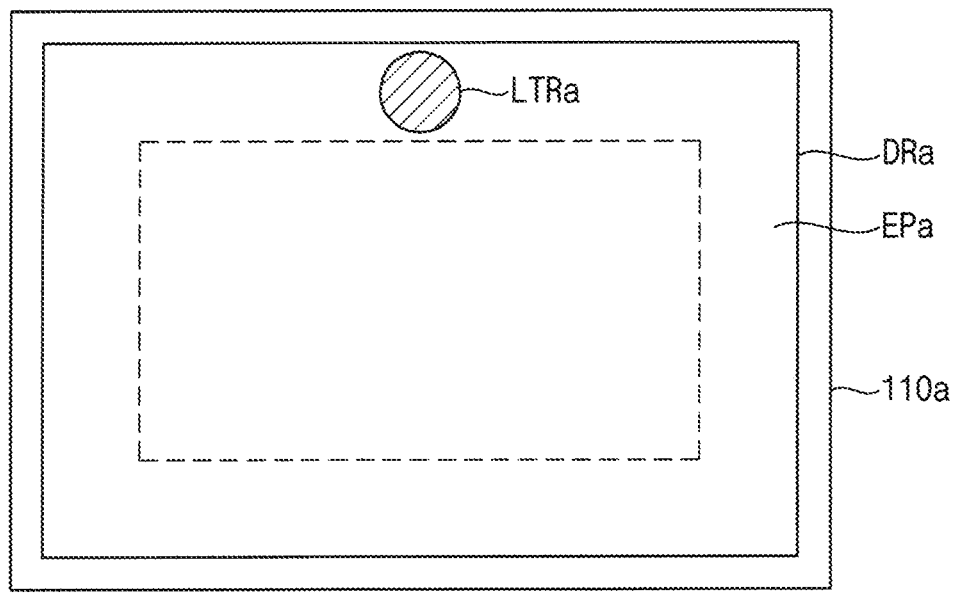
FIGS. 2A through 2D are diagrams illustrating examples of display panels including light transmission regions at various positions according to some embodiments of the present disclosure.
Figure 2B:
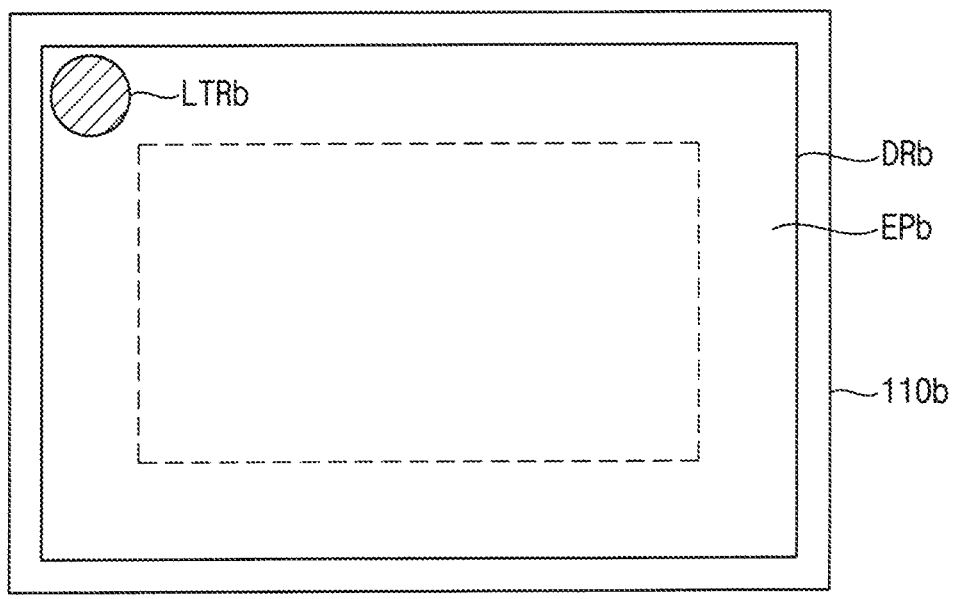
Figure 2C:
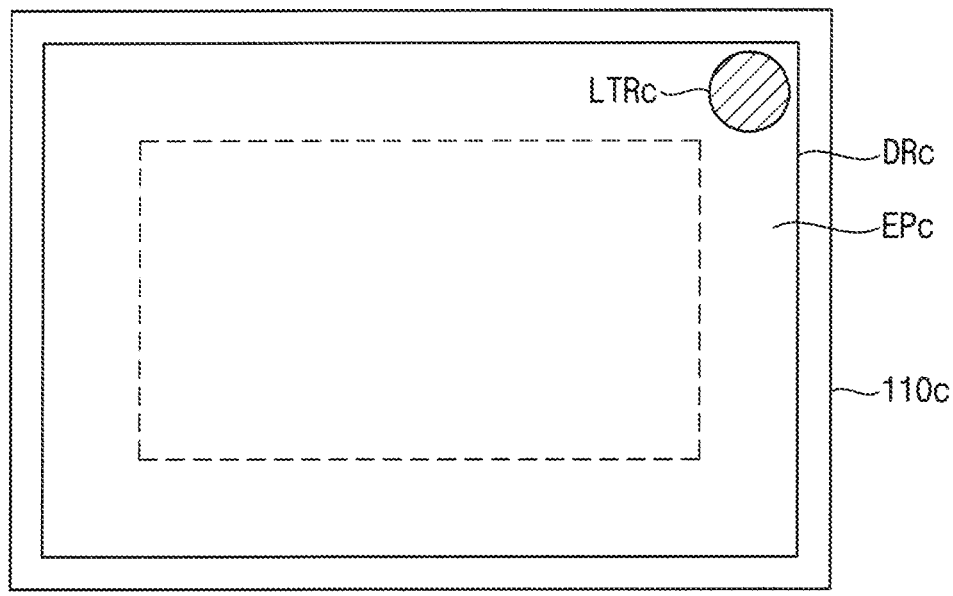
Figure 2D:
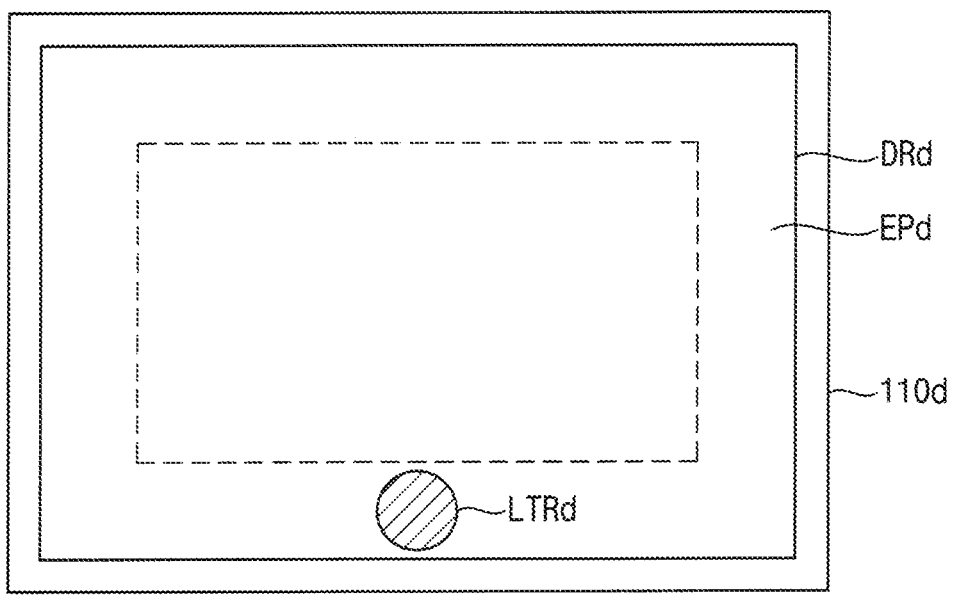
Figure 3A:
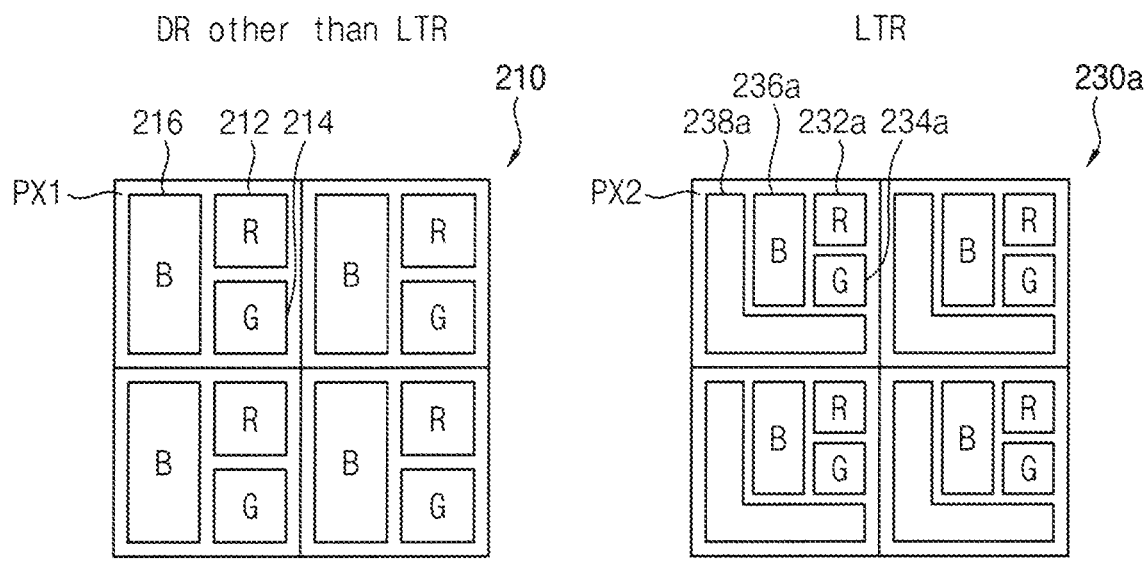
FIGS. 3A through 3C are diagrams illustrating examples of first pixels located in a display region other than a light transmission region and second pixels located in the light transmission region.
Figure 3B:
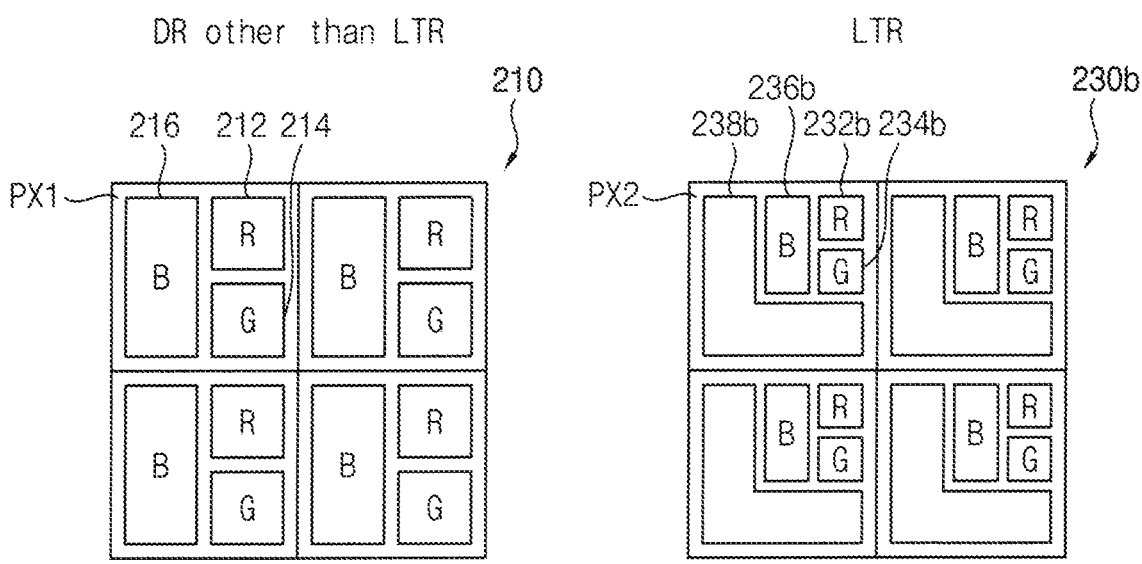
Figure 3C:
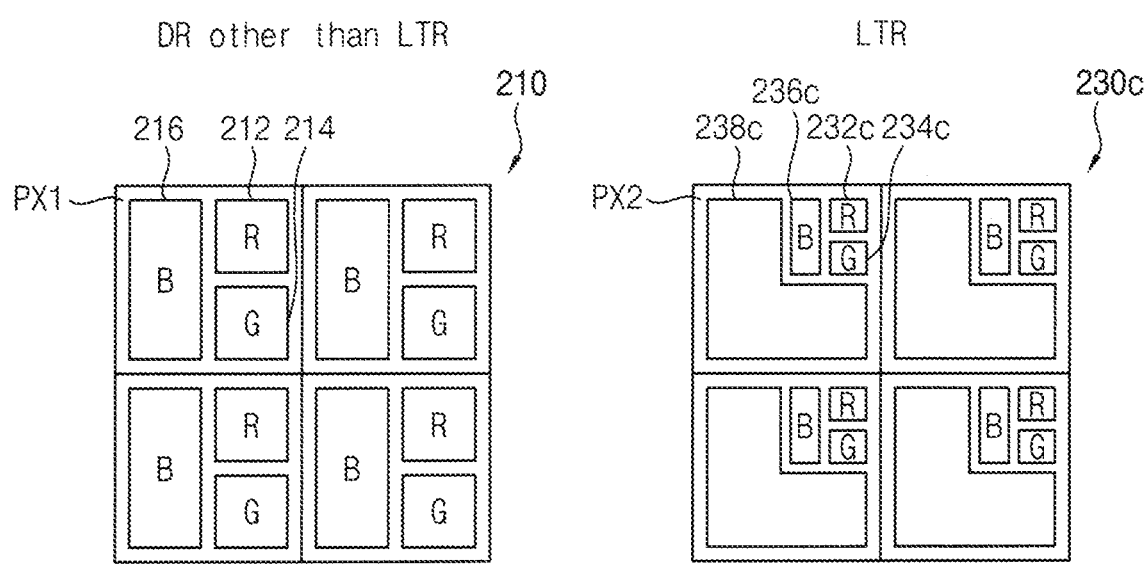
Figure 4A:
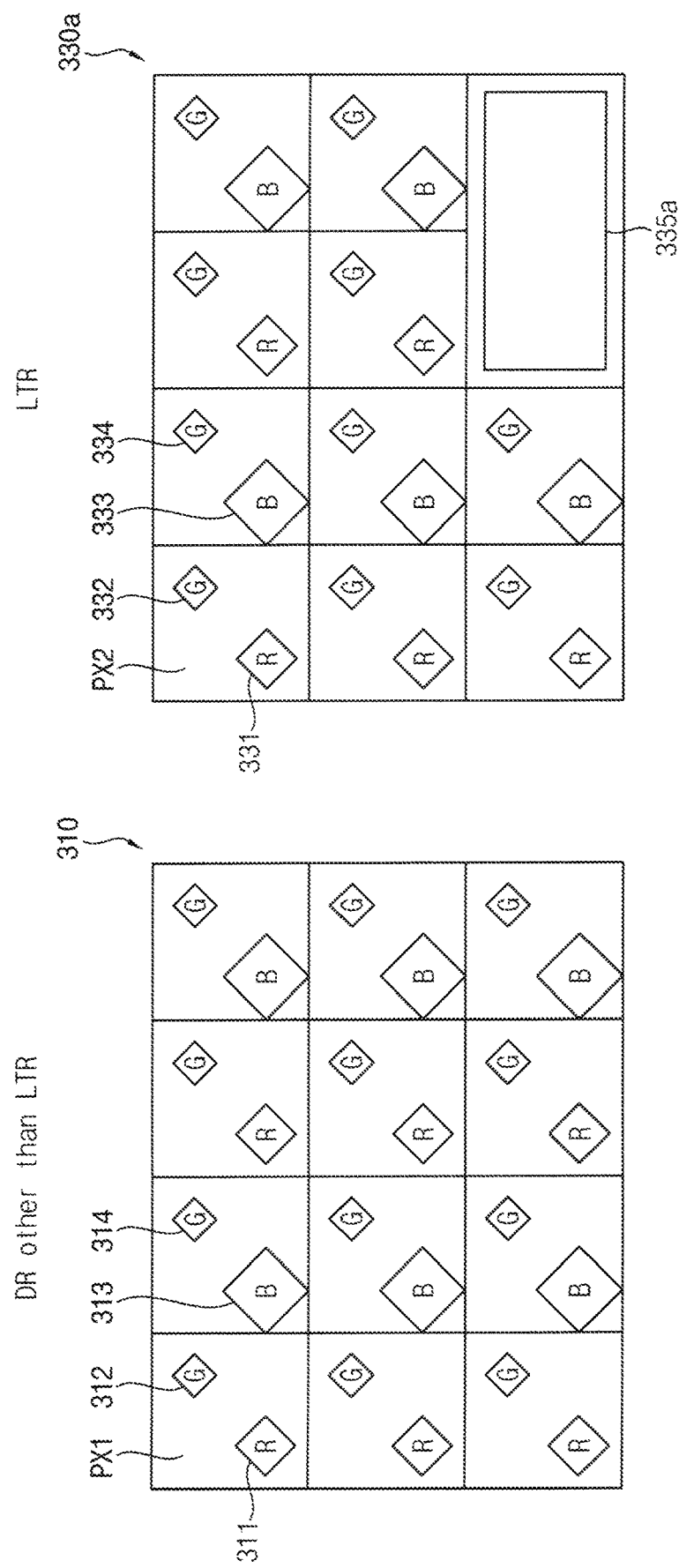
FIGS. 4A through 4C are diagrams illustrating other examples of first pixels located in a display region other than a light transmission region and second pixels located in the light transmission region.
Figure 4B:
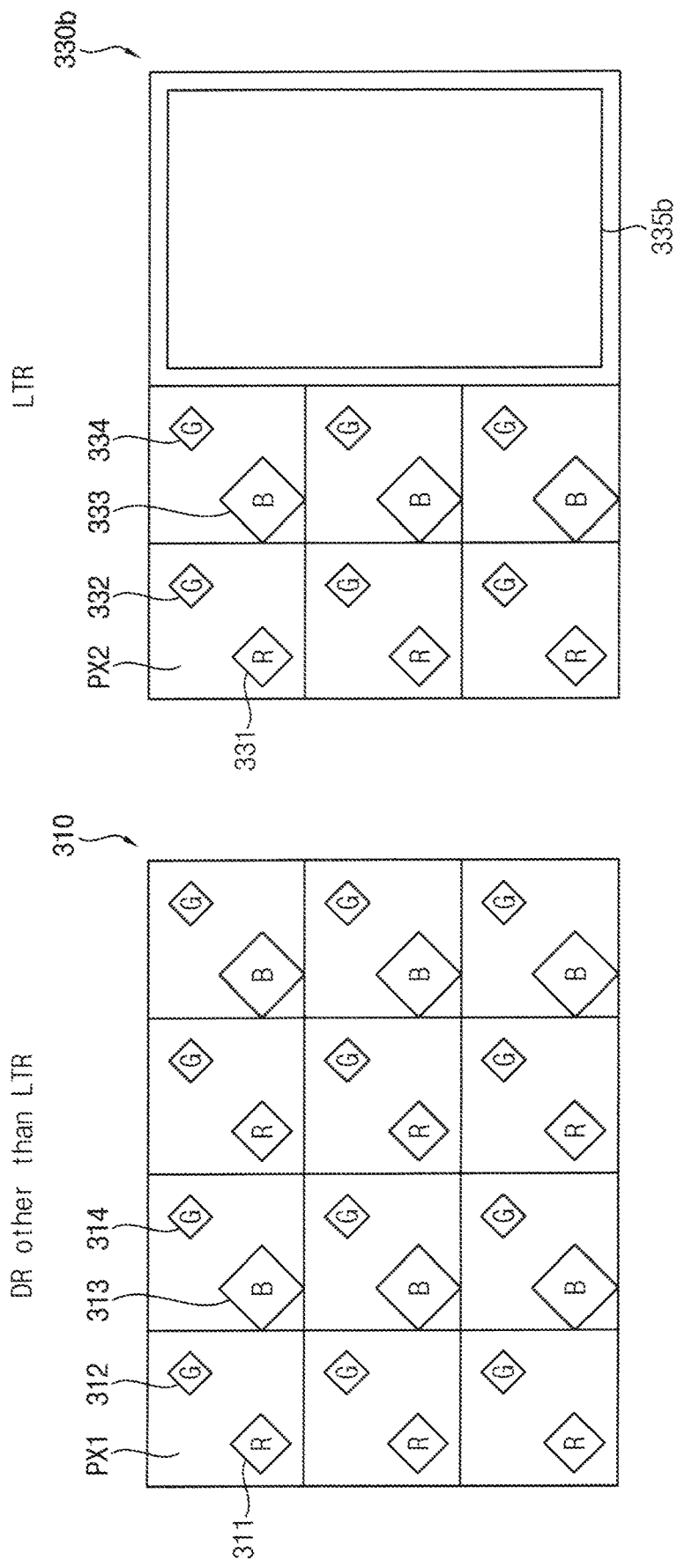
Figure 4C:
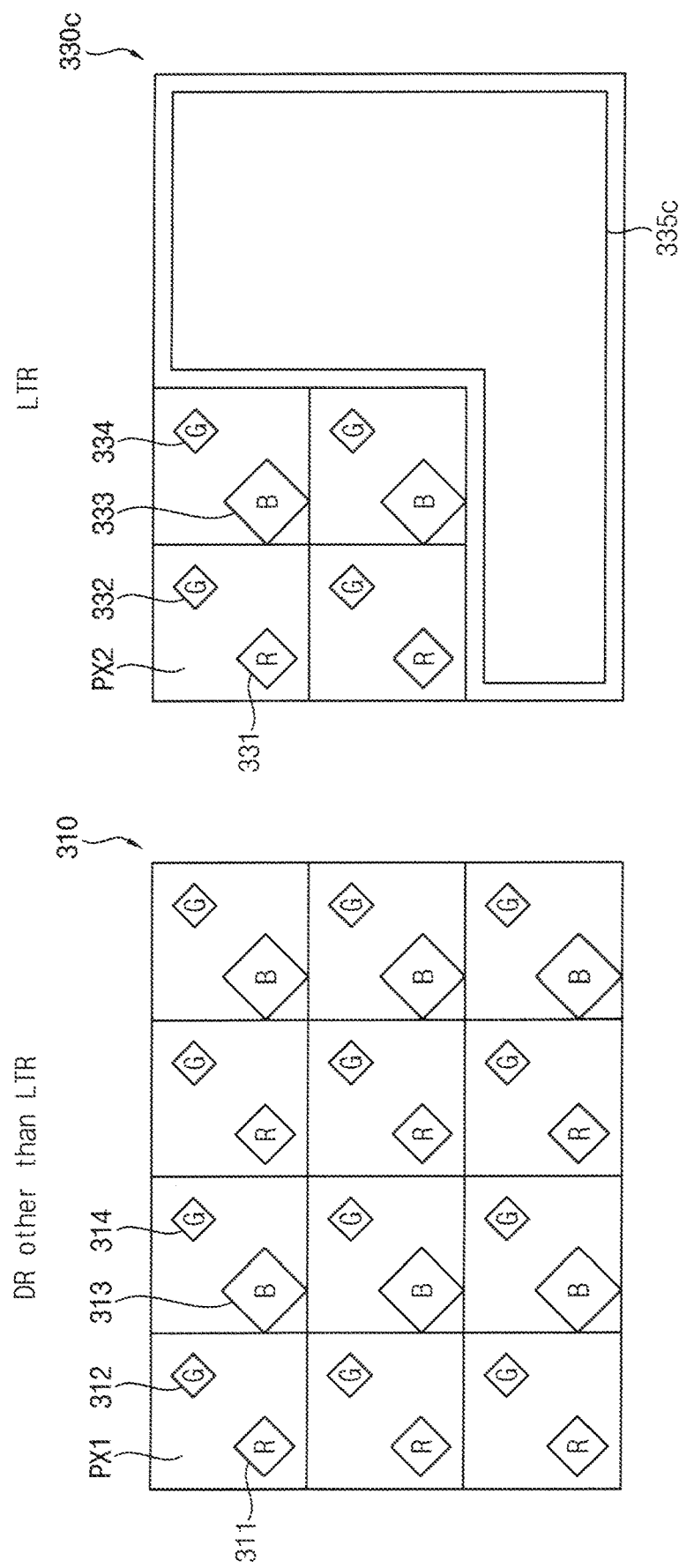
Figure 5:
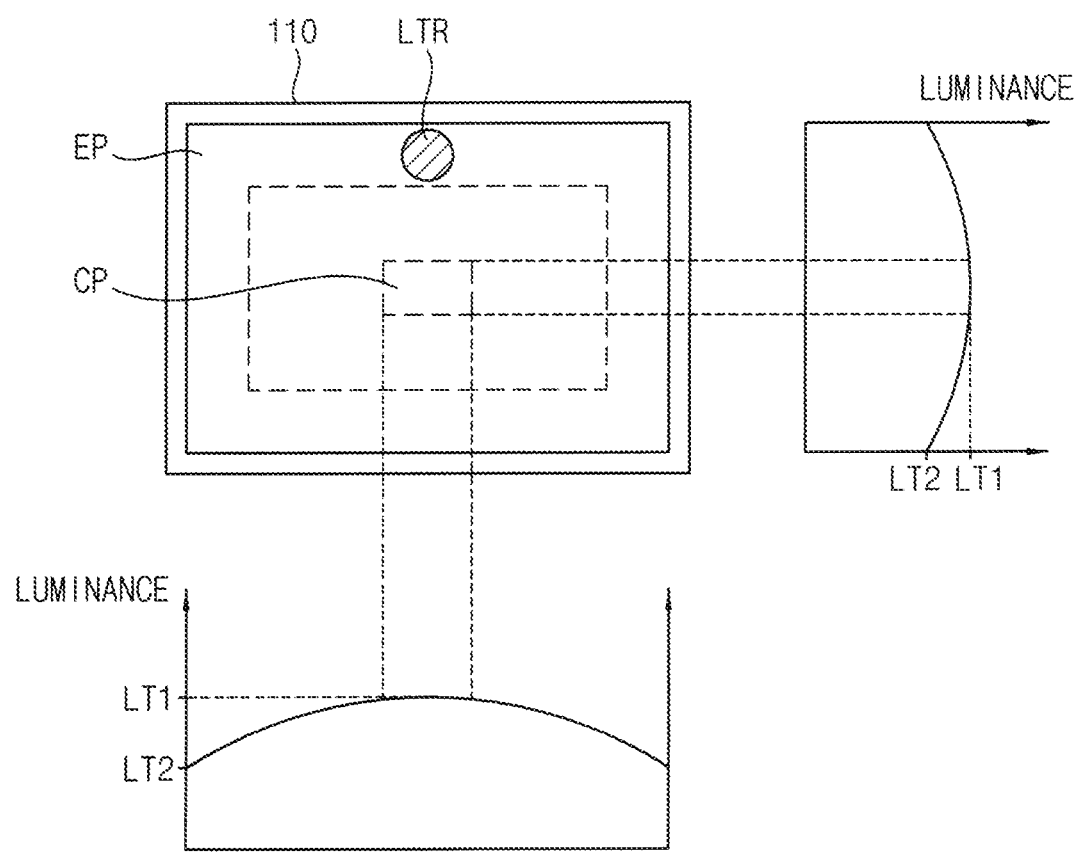
FIG. 5 is a diagram for describing an example of an edge-dimming operation performed by a display device according to some embodiments of the present disclosure.
Figures 6, 7:
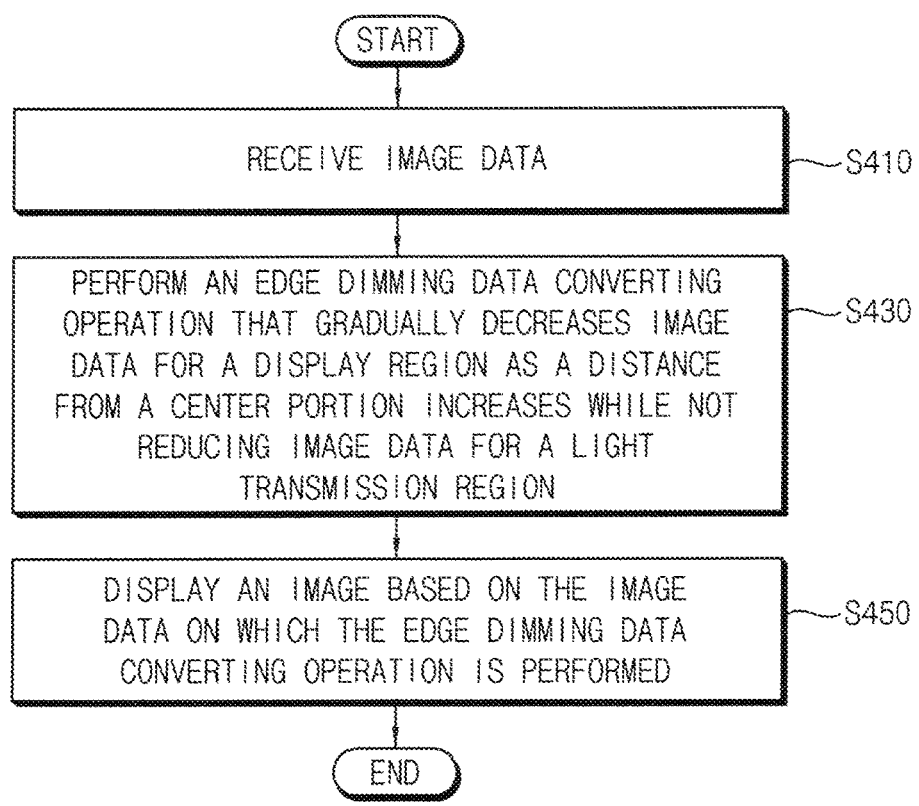
FIG. 6 is a diagram for describing examples of power consumption in a display device according to some embodiments of the present disclosure.
FIG. 7 is a flowchart illustrating a method of operating a display device according to some embodiments of the present disclosure.

FIG. 1 is a block diagram illustrating a display device according to some embodiments of the present disclosure, FIGS. 2A through 2D are diagrams illustrating examples of display panels including light transmission regions at various positions according to some embodiments of the present disclosure, FIGS. 3A through 3C are diagrams illustrating examples of first pixels located in a display region other than a light transmission region and second pixels located in the light transmission region, FIGS. 4A through 4C are diagrams illustrating other examples of first pixels located in a display region other than a light transmission region and second pixels located in the light transmission region, FIG. 5 is a diagram for describing an example of an edge-dimming operation performed by a display device according to some embodiments of the present disclosure, and FIG. 6 is a diagram for describing examples of power consumption in a display device according to some embodiments of the present disclosure.

Referring to FIG. 1, a display device 100 according to some embodiments of the present disclosure may include a display panel 110 that includes a plurality of pixels PX1 and PX2, and a panel driver 120 that drives the display panel 110. In some embodiments, the panel driver 120 may include a data driver 130 that provides data signals DS to the plurality of pixels PX1 and PX2, a scan driver 140 that provides scan signals SS to the plurality of pixels PX1 and PX2, and a controller 150 that controls the data driver 130 and the scan driver 140.

The display panel 110 may include a plurality of scan lines, a plurality of data lines, and the plurality of pixels PX1 and PX2 coupled to the plurality of scan lines and the plurality of data lines. In some embodiments, each pixel PX1 and PX2 may include at least one capacitor, at least two transistors, and an organic light emitting diode (OLED). The display panel 110 may be an OLED display panel. In other embodiments, the display panel 110 may be a liquid crystal display (LCD) panel, or any other suitable panel.

The display panel 110 may have a display region DR in which the pixels PX1 and PX2 are formed, and may include a light transmission region LTR within an edge portion EP of the display region DR. The light transmission region LTR may be located to overlap an electronic element. For example, the edge portion EP of the display region DR may be, but is not limited to, a portion of the display region DR including four edges of the display region DR, as illustrated in FIG. 1.

In other embodiments, the edge portion EP of the display region DR may be a portion of the display region DR including one, two, or three edges of the display region DR. The light transmission region LTR may transmit external light (and/or light generated by the electronic element), and the external light may reach the electronic element through the light transmission region LTR. In an example, the electronic element may be a camera module, and the camera module may capture an external image through the light transmission region LTR. In other examples, the electronic element may be a senor module, such as a face recognition sensor module, a proximity sensor module, a motion sensor module, etc., and the senor module may sense the external light transmitted through the light transmission region LTR.

According to some embodiments, the light transmission region LTR may be located at any position within the edge portion EP of the display region DR. In an example, as illustrated in FIG. 2A, a light transmission region LTRa may be located within an edge portion EPa of a display region DRa of a display panel 110a, and may have a vertical position adjacent to a top edge of the display region Dra, and a horizontal position corresponding to a horizontal center of the display region DRa.

In another example, as illustrated in FIG. 2B, a light transmission region LTRb may be located within an edge portion EPb of a display region DRb of a display panel 110b, and may have a vertical position adjacent to a top edge of the display region DRb, and a horizontal position adjacent to a left edge of the display region DRb.

In still another example, as illustrated in FIG. 2C, a light transmission region LTRc may be located within an edge portion EPc of a display region DRc of a display panel 110c, and may have a vertical position adjacent to a top edge of the display region DRc, and a horizontal position adjacent to a right edge of the display region DRc.

In yet another example, as illustrated in FIG. 2D, a light transmission region LTRd may be located within an edge portion EPd of a display region DRd of a display panel 110d, and may have a vertical position adjacent to a bottom edge of the display region DRd, and a horizontal position corresponding to a horizontal center of the display region DRd.

Although FIGS. 2A through 2D illustrate examples of positions of the light transmission region LTRa through LTRd, the position of the light transmission region LTR is not limited to the examples of FIGS. 2A through 2D. Further, although FIGS. 2A through 2D illustrate examples of the display panel 110a through 110d including one light transmission region LTRa through LTRd, in some embodiments, the display panel 110a through 110d may include two or more light transmission regions LTRa through LTRd.

In the display device 100 according to some embodiments of the present disclosure, first pixels PX1 located in the display region DR other than the light transmission region LTR, and second pixels PX2 located in the light transmission region LTR, may have different structures, different resolutions, or different arrangements.

In some embodiments, the first pixels PX1 located in the display region DR other than the light transmission region LTR, and the second pixels PX2 located in the light transmission region LTR, may have substantially the same resolution, but may have different structures. For example, as illustrated in FIGS. 3A through 3C, a resolution (or pixels per inch (PPI)) of the light transmission region LTR may be substantially the same as a resolution (or PPI) of the display region DR other than the light transmission region LTR, although each second pixel PX2 in the light transmission region LTR may further include a light-transmitting window 238a, 238b, and 238c, unlike each first pixel PX1 in the display region DR other than the light transmission region LTR.

Illustrated as 210 in FIGS. 3A through 3C, the first pixel PX1 in the display region DR other than the light transmission region LTR (e.g., an area of the display region DR that is outside of, that does not include, or that excludes, the light transmission region LTR) may include first light-emitting regions 212, 214, and 216 that respectively emit lights having different colors. For example, the first pixel PX1 may include a first red light-emitting region 212, a first green light-emitting region 214, and a first blue light-emitting region 216, and the first red, green, and blue light-emitting regions 212, 214, and 216 may be light-emitting regions of red, green, and blue OLEDs.

Further, as illustrated as 230a, 230b, and 230c in FIGS. 3A through 3C, the second pixel PX2 in the light transmission region LTR may include second light-emitting regions 232a, 234a, 236a, 232b, 234b, 236b, 232c, 234c, and 236c that emit lights having the different colors, and a light-transmitting window 238a, 238b, 238c that transmits the external light such that the external light reaches the electronic element. For example, the second pixel PX2 may include a second red light-emitting region 232a, 232b, 232c, a second green light-emitting region 234a, 234b, 234c, a second blue light-emitting region 236a, 236b, 236c, and the light-transmitting window 238a, 238b, 238c, and the second red, green, and blue light-emitting regions 232a, 234a, 236a, 232b, 234b, 236b, 232c, 234c, 236c may be light-emitting regions of red, green, and blue OLEDs. Further, the light transmission region LTR may transmit the external light (and/or light generated by the electronic element) through the light-transmitting window 238a, 238b, 238c included in each second pixel PX2.

In some embodiments, a size of the plurality of second light-emitting regions 232a, 234a, 236a, 232b, 234b, 236b, 232c, 234c, and 236c of each second pixel PX2 may be smaller than a size of the plurality of first light-emitting regions 212, 214, and 216 of each first pixel PX1, and a size of the light-transmitting window 238a, 238b, 238c included in each second pixel PX2 may correspond to a difference between the size of the plurality of first light-emitting regions 212, 214, and 216 and the size of the plurality of second light-emitting regions 232a, 234a, 236a, 232b, 234b, 236b, 232c, 234c, and 236c.

In an example, as illustrated as 230a in FIG. 3A, the size of the plurality of second light-emitting regions 232a, 234a, and 236a of each second pixel PX2 may be about 70% of the size of the plurality of first light-emitting regions 212, 214, and 216, and the size of the light-transmitting window 238a included in each second pixel PX2 may be about 30% of the size of the plurality of first light-emitting regions 212, 214, and 216.

In another example, as illustrated as 230b in FIG. 3B, the size of the plurality of second light-emitting regions 232b, 234b, and 236b of each second pixel PX2 may be about 50% of the size of the plurality of first light-emitting regions 212, 214, and 216, and the size of the light-transmitting window 238b included in each second pixel PX2 may be about 50% of the size of the plurality of first light-emitting regions 212, 214, and 216.

In still another example, as illustrated as 230c in FIG. 3C, the size of the plurality of second light-emitting regions 232c, 234c, and 236c of each second pixel PX2 may be about 25% of the size of the plurality of first light-emitting regions 212, 214, and 216, and the size of the light-transmitting window 238c included in each second pixel PX2 may be about 75% of the size of the plurality of first light-emitting regions 212, 214, and 216.

Although FIGS. 3A through 3C illustrate examples 230a, 230b, and 230c of each second pixel PX2 where the size of the light-transmitting windows 238a, 238b, and 238c respectively corresponds to about 30%, about 50%, and about 75% of the size of the plurality of first light-emitting regions 212, 214, and 216, according to other embodiments of the present disclosure, the light-transmitting window 238a, 238b, 238c of each second pixel PX2 may have any size, or may have a size that is greater than about 0% and less than about 100% of the size of the plurality of first light-emitting regions 212, 214, and 216.

In other embodiments, the first pixels PX1 located in the display region DR other than the light transmission region LTR, and the second pixels PX2 located in the light transmission region LTR, may have different resolutions (or different PPIs). For example, as illustrated in FIGS. 4A through 4C, each second pixel PX2 in the light transmission region LTR may have a structure that is substantially the same as a structure of each first pixel PX1 in the display region DR other than the light transmission region LTR, but a resolution of the light transmission region LTR may be smaller than a resolution of the display region DR other than the light transmission region LTR.

For example, N first pixels PX1 may be located in an area (e.g., a predetermined area) of the display region DR other than the light transmission region LTR, where N is an integer that is greater than 0, and M second pixels PX2 may be located in another area (e.g., a predetermined area) of the light transmission region LTR, where M is an integer that is greater than 0 and that is less than N. For example, the number of the first pixels PX1 in the area of the display region DR other than the light transmission region LTR may be twelve, as illustrated as 310 in FIGS. 4A through 4C, and the number of the second pixels PX2 in the area of the light transmission region LTR may be less than twelve, as illustrated as 330a, 330b, and 330c in FIGS. 4A through 4C. Further, the light transmission region LTR may include a light-transmitting window 335a, 335b, 335c having a size corresponding to a difference between the number of the first pixels PX1 and the number of the second pixels PX2. The light transmission region LTR may transmit the external light (and/or light generated by the electronic element) through the light-transmitting window 335a, 335b, 335c.

In an example, as illustrated as 330a in FIG. 4A, ten of the second pixels PX2 may be located in the corresponding area of the light transmission region LTR, and the light transmission region LTR may include the light-transmitting window 335a having a size corresponding to about two of the first (or second) pixels PX1, which corresponds to about 17% of the corresponding area.

In another example, as illustrated as 330b in FIG. 4B, six of the second pixels PX2 may be located in the corresponding area of the light transmission region LTR, and the light transmission region LTR may include the light-transmitting window 335b having a size corresponding to about six of the first (or second) pixels PX1, which corresponds to about 50% of the corresponding area.

In still another example, as illustrated as 330c in FIG. 4C, four of the second pixels PX2 may be located in the corresponding area of the light transmission region LTR, and the light transmission region LTR may include the light-transmitting window 335c having a size corresponding to about eight of the first (or second) pixels PX1, which corresponds to about 67% of the corresponding area.

Although FIGS. 4A through 4C illustrate examples 330a, 330b, and 330c of the light transmission region LTR where the light-transmitting windows 335a, 335b, and 335c, which have the respective sizes corresponding to about 17%, about 50%, and about 67% of the corresponding area (e.g., predetermined area), are differently located within the area corresponding to twelve of the second pixels PX2, according to other embodiments of the present disclosure, a ratio of the size of the light-transmitting window 335a, 335b, 335c to a size of the light transmission region LTR may be any ratio (e.g., may be any ratio that is greater than about 0% and less than about 100%).

Further, in some embodiments, as illustrated in FIGS. 4A through 4C, the first pixels PX1 that are located in the display region DR other than the light transmission region LTR, and the second pixels PX2 located in the light transmission region LTR may have substantially the same structure and/or substantially the same arrangement.

For example, as illustrated in FIGS. 4A through 4C, the first pixels PX1 and the second pixels PX2 may be arranged in an RGBG PenTile®/PENTILE® structure (PENTILE® is a registered trademark owned by Samsung Display Co., Ltd.). In this case, as illustrated as 310 in FIGS. 4A through 4C, each first pixel PX1 may include a first red light-emitting region 311 and a first green light-emitting region 312, or may include a first blue light-emitting region 313 and a second red light-emitting region 314. Further, as illustrated as 330a, 330b, and 330c in FIGS. 4A through 4C, each second pixel PX2 may include a second red light-emitting region 331 and a third green light-emitting region 332, or may include a second blue light-emitting region 333 and a fourth green light-emitting region 334.

Although FIGS. 4A through 4C illustrate examples 310, 330a, 330b, and 330c where the first pixels PX1 and the second pixels PX2 may be arranged in the RGBG PenTile®/ PENTILE® structure (PENTILE® is a registered trademark owned by Samsung Display Co., Ltd.), the arrangement of the first pixels PX1 and/or the arrangement of the second pixels PX2 are not limited to the RGBG PenTile®/PENTILE® structure (PENTILE® is a registered trademark owned by Samsung Display Co., Ltd.).

Referring back to FIG. 1, the data driver 130 may generate the data signals DS based on a data control signal DCTRL, and may output image data ODAT received from the controller 150, and also may provide the data signals DS to the plurality of pixels PX1 and PX2 through the plurality of data lines. In some embodiments, the data control signal DCTRL may include, but is not limited to, an output data enable signal, a horizontal start signal and a load signal. In some embodiments, the data driver 130 and the controller 150 may be implemented with a single integrated circuit, and the integrated circuit may be referred to as a timing controller embedded data driver (TED). In other embodiments, the data driver 130 and the controller 150 may be implemented with separate integrated circuits.

The scan driver 140 may generate the scan signals SS based on a scan control signal SCTRL received from the controller 150, and may provide the scan signals SS to the plurality of pixels PX1 and PX2 through the plurality of scan lines. In some embodiments, the scan control signal SCTRL may include, but is not limited to, a scan start signal and a scan clock signal. In some embodiments, the scan driver 140 may be integrated in, or formed in, a peripheral portion around the display region DR of the display panel 110. In other embodiments, the scan driver 140 may be implemented with one or more integrated circuits.

Figure 13:
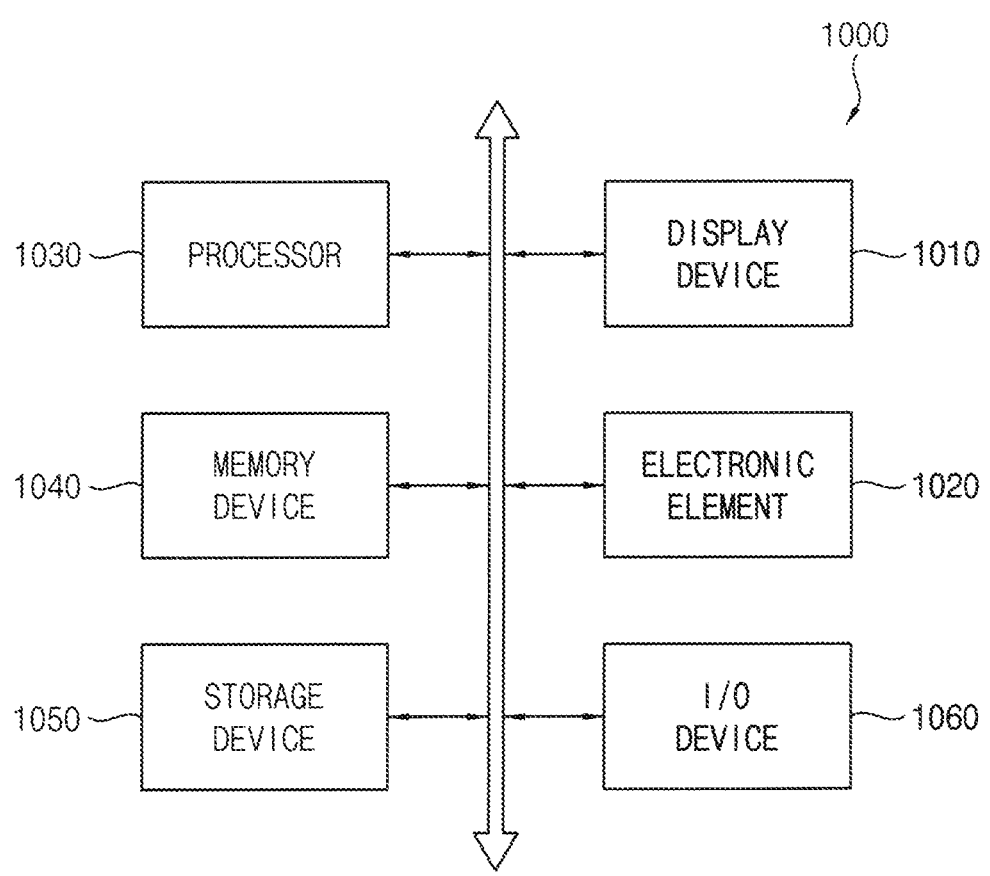
FIG. 13 is a block diagram illustrating an electronic device including a display device according to some embodiments of the present disclosure.

The controller 150 (e.g., a timing controller (TCON)) may receive input image data IDAT and a control signal CTRL from an external host processor (e.g., a processor 1030 illustrated in FIG. 13). In some embodiments, the control signal CTRL may include, but is not limited to, a vertical synchronization signal, a horizontal synchronization signal, an input data enable signal, a master clock signal, etc. The controller 150 may generate the output image data ODAT, the data control signal DCTRL, and the scan control signal SCTRL based on the input image data IDAT and the control signal CTRL. The controller 150 may control an operation of the data driver 130 by providing the output image data ODAT and the data control signal DCTRL to the data driver 130, and may control an operation of the scan driver 140 by providing the scan control signal SCTRL to the scan driver 140.

In the display device 100, according to some embodiments of the present disclosure, because the display panel 110 includes the light transmission region LTR within the display region DR, an image displayed in the display region DR other than the light transmission region LTR, and an image displayed in the light transmission region LTR, may be distinguished by a user. Accordingly, a boundary of the light transmission region LTR may be perceived by the user. To reduce or prevent perceptibility of the boundary of the light transmission region LTR, and to reduce power consumption of the display device 100, the panel driver 120 of the display device 100 according to some embodiments of the present disclosure may perform an edge-dimming operation that gradually decreases (e.g., spatially) a luminance of the display region DR other than the light transmission region LTR from a center portion CP of the display region to the edge portion EP of the display region DR while not reducing a luminance of (e.g., while maintaining a luminance of) the light transmission region LTR.

For example, as illustrated in FIG. 5, even if the input image data IDAT representing the same gray level are received with respect to the entire display region DR of the display panel 110, the panel driver 120 may perform the edge-dimming operation such that the center portion CP of the display region DR has a first luminance LT1, the edge portion EP of the display region DR has a second luminance LT2 that is lower than the first luminance LT1, and the luminance of the display region DR other than the light transmission region LTR is gradually decreased from the first luminance LT1 to the second luminance LT2 along a direction from the center portion CP to the edge portion EP.

The power consumption of the display device 100 may be reduced by the edge-dimming operation. For example, as illustrated in FIG. 6, in a case where the edge-dimming operation is not performed, a power of about 2.1 W may be consumed at a logic circuit ("LOGIC") of the display device 100, or at the panel driver 120, and a power of about 5.3 W may be consumed at the display panel ("PANEL") 110 of the display device 100. Thus, a power of about 7.4 W may be consumed in total ("TOTAL") at the display device 100.

However, in a case where the edge-dimming operation is performed at a dimming level of about 10%, a power of about 4.8 W may be consumed at the display panel 110 of the display device 100, and thus the total power consumption of the display device 100 may be reduced from about 7.4 W to about 6.9 W.

Further, in a case where the edge-dimming operation is performed at a dimming level of about 20%, a power of about 4.3 W may be consumed at the display panel 110 of the display device 100, and thus the total power consumption of the display device 100 may be reduced from about 7.4 W to about 6.4 W.

In some embodiments, to perform the edge-dimming operation, the panel driver 120 may include an edge-dimming-data converter 160. The edge-dimming-data converter 160 may perform an edge-dimming-data-converting operation that generates the output image data ODAT by gradually decreasing the input image data IDAT (e.g., gradually decreasing gray levels of the input image data IDAT) for the display region DR other than the light transmission region LTR as a distance from the center portion CP increases, while not decreasing (e.g., while maintaining) the input image data IDAT for the light transmission region LTR. The data driver 130 may provide the data signals DS to the plurality of pixels PX1 and PX2 based on the output image data ODAT on which the edge-dimming-data-converting operation is performed. Accordingly, as illustrated in FIG. 5, a luminance of the display region DR other than the light transmission region LTR may be gradually decreased from the first luminance LT1 to the second luminance LT2 along the direction from the center portion CP to the edge portion EP. In some embodiments, as illustrated in FIG. 1, the edge-dimming-data converter 160 may be located or formed inside the controller 150, but a position of the edge-dimming-data converter 160 is not limited to the example of FIG. 1.

Further, as illustrated in FIGS. 3A through 4C, because the light transmission region LTR includes the light-transmitting window 238a, 238b, 238c, 335a, 335b, 335c, a light-emitting region size per unit area of the light transmission region LTR may be smaller than a light-emitting region size per unit area of the display region DR other than the light transmission region LTR. Also, a luminance of the light transmission region LTR may be lower than a luminance of the display region DR other than the light transmission region LTR. Accordingly, an image displayed in the display region DR other than the light transmission region LTR, and an image displayed in the light transmission region LTR, may be distinguished by a user. Accordingly, a boundary of the light transmission region LTR may be perceived by the user.

However, in the display device 100 according to some embodiments of the present disclosure, the edge-dimming-data converter 160 may decrease the input image data IDAT for the first pixels PX1 within the edge portion EP, or the input image data IDAT for the first pixels PX1 adjacent to the light transmission region LTR, while not decreasing the input image data IDAT for the second pixels PX2 of the light transmission region LTR. Accordingly, the first pixels PX1 adjacent to the light transmission region LTR, and the second pixels PX2 of the light transmission region LTR, may have substantially the same luminance, and the boundary of the light transmission region LTR may be imperceptible to the user.

In some embodiments, the panel driver 120 may further include an edge-dimming-parameter storage 170 that stores an edge-dimming-luminance parameter representing a ratio of a luminance of the edge portion EP to a luminance of the center portion CP. For example, the edge-dimming-luminance parameter may represent a ratio of the second luminance LT2 for the edge portion EP to the first luminance LT1 for the center portion CP, illustrated in FIG. 5. Further, in some embodiments, as illustrated in FIG. 1, the edge-dimming-parameter storage 170 may be located or formed inside the controller 150, but a position of the edge-dimming-parameter storage 170 is not limited to the example of FIG. 1. The edge-dimming-data converter 160 may decrease the image input data IDAT for the display region DR other than the light transmission region LTR based on the edge-dimming-luminance parameter stored in the edge-dimming-parameter storage 170. For example, in a case where the edge-dimming-luminance parameter indicates about 50%, the edge-dimming-data converter 160 may perform the edge-dimming-data-converting operation such that the edge portion EP has a luminance corresponding to about 50% of a luminance of the center portion CP.

Further, in some embodiments, the edge-dimming-luminance parameter stored in the edge-dimming-parameter storage 170 may be changed by a user setting. For example, a user may set the ratio of the luminance of the edge portion EP to the luminance of the center portion CP, and the external host processor may provide an edge-dimming-parameter signal EDPS representing the ratio set by the user. The controller 150 may change the edge-dimming-luminance parameter stored in the edge-dimming-parameter storage 170 in response to the edge-dimming-parameter signal EDPS.

In some embodiments, the panel driver 120 may further perform a light-transmission-region-compensation operation that increases the luminance of the light transmission region LTR. For example, to generate the output image data ODAT, the edge-dimming-data converter 160 may perform not only the edge-dimming-data-converting operation that gradually decreases the input image data IDAT for the display region DR other than the light transmission region LTR as the distance from the center portion CP increases, but may also perform a light-transmission-region-compensation-data-converting operation that increases the input image data IDAT for the light transmission region LTR. The data driver 130 may provide the data signals DS to the plurality of pixels PX1 and PX2 based on the output image data ODAT on which the edge-dimming-data-converting operation and the light-transmission-region-compensation-data-converting operation are performed. Accordingly, the first pixels PX1 adjacent to the light transmission region LTR and the second pixels PX2 of the light transmission region LTR may have substantially the same luminance, and the boundary of the light transmission region LTR may not be perceived by the user.

In other embodiments, the edge-dimming-parameter storage 170 may store the edge-dimming-luminance parameter representing the ratio of the luminance of the edge portion EP to the luminance of the center portion CP, and a light-transmission-region-compensation parameter representing a luminance-increasing rate of the light transmission region LTR. The edge-dimming-data converter 160 may generate the output image data ODAT by decreasing the input image data IDAT for the display region DR other than the light transmission region LTR based on the edge-dimming-luminance parameter stored in the edge-dimming-parameter storage 170, and by increasing the input image data IDAT for the light transmission region LTR based on the light-transmission-region-compensation parameter stored in the edge-dimming-parameter storage 170.

For example, in a case where the edge-dimming-luminance parameter indicates about 70% and the light-transmission-region-compensation parameter indicates about 30%, the edge-dimming-data converter 160 may perform the edge-dimming-data-converting operation such that the edge portion EP has a luminance corresponding to about 70% of a luminance of the center portion CP, and may perform the light-transmission-region-compensation-data-converting operation to increase the luminance of a luminance of the light transmission region LTR by about 30%.

In some embodiments, the edge-dimming-luminance parameter and the light-transmission-region-compensation parameter stored in the edge-dimming-parameter storage 170 may be changed by a user setting. For example, a user may set the ratio of the luminance of the edge portion EP to the luminance of the center portion CP, and may set the luminance-increasing rate of the light transmission region LTR, and the external host processor may provide the edge-dimming-parameter signal EDPS representing the ratio and the luminance-increasing rate set by the user. The controller 150 may change the edge-dimming-luminance parameter and the light-transmission-region-compensation parameter stored in the edge-dimming-parameter storage 170 in response to the edge-dimming-parameter signal EDPS.

As described above, in the display device 100 according to some embodiments of the present disclosure, the display panel 110 may include the light transmission region LTR located to overlap the electronic element within the edge portion EP of the display region DR. Because the light transmission region LTR is located within the display region DR, a screen ratio, or a screen-to-body ratio (STBR) of the display panel 110, may be improved. Further, the panel driver 120 may perform the edge-dimming operation that gradually decreases the luminance of the display region DR other than the light transmission region LTR from the center portion CP of the display region DR to the edge portion EP of the display region DR, while not reducing the luminance of the light transmission region LTR. Accordingly, the power consumption of the display device 100 may be reduced, and the boundary of the light transmission region LTR may not less likely to be perceived.

Figures 8, 9:
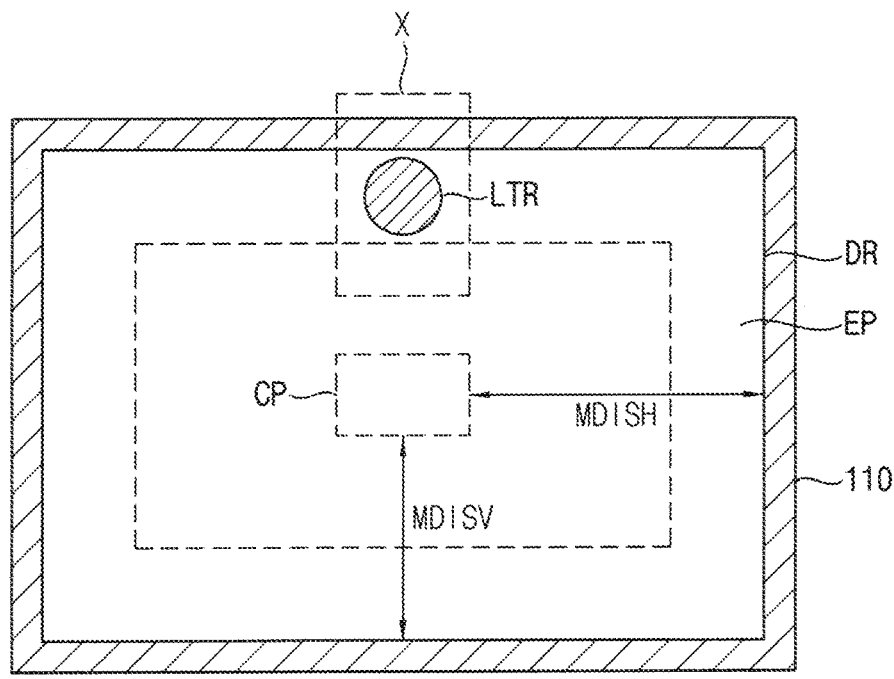
FIG. 8 is a diagram illustrating an example of a display panel included in a display device according to some embodiments of the present disclosure.
FIG. 9 is a diagram for describing an example of an edge-dimming operation performed by a display device according to some embodiments of the present disclosure.
Figure 10:
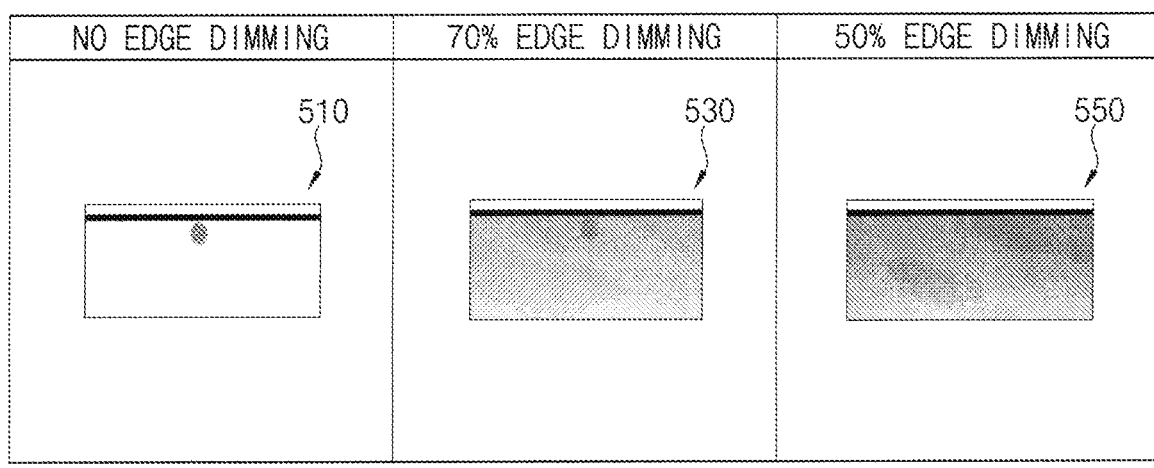
FIG. 10 is a diagram for describing examples of an X portion of a display panel of FIG. 8 in a method of operating a display device according to some embodiments of the present disclosure.

FIG. 7 is a flowchart illustrating a method of operating a display device according to some embodiments of the present disclosure, FIG. 8 is a diagram illustrating an example of a display panel included in a display device according to some embodiments of the present disclosure, FIG. 9 is a diagram for describing an example of an edge-dimming operation performed by a display device according to some embodiments of the present disclosure, and FIG. 10 is a diagram for describing examples of an X portion of a display panel of FIG. 8 in a method of operating a display device according to some embodiments of the present disclosure.

Referring to FIGS. 1, 7, and 8, a panel driver 120 may receive image data (or input image data IDAT) (S410), and may perform an edge-dimming operation that gradually decreases a luminance of a display region DR other than a light transmission region LTR from a center portion CP of the display region DR to an edge portion EP of the display region DR, while not reducing a luminance of the light transmission region LTR (S430). For example, the panel driver 120 may perform an edge-dimming-data-converting operation that gradually decreases the image data for the display region DR other than the light transmission region LTR as a distance from the center portion CP increases, and by not decreasing the image data for the light transmission region LTR (S430). For example, as a horizontal distance from the center portion CP to a first pixel PX1 increases from 0 to a horizontal maximum distance MDISH, the image data for the first pixel PX1 may be gradually decreased. Further, as a vertical distance from the center portion CP to the first pixel PX1 increases from 0 to a vertical maximum distance MDISV, the image data for the first pixel PX1 may be gradually decreased.

For example, as illustrated in FIG. 9, in a case where a ratio of a luminance of the edge portion EP to a luminance of the center portion CP is set to about 70%, and the image data representing the same gray level (e.g., the maximum gray level or a 255-gray level) are received with respect to the first pixels PX in the display region DR other than the light transmission region LTR, the following may be true: the first pixel PX1 in the center portion CP may have a luminance of about 400 nit; the first pixel PX1 having a distance of about 0.5 mm from the center portion CP may have a luminance of about 399 nit; the first pixel PX1 having a distance of about 1 mm from the center portion CP may have a luminance of about 398 nit; the first pixel PX1 having a distance of about 1.5 mm from the center portion CP may have a luminance of about 397 nit; the first pixel PX1 having a distance corresponding to about 1.5 mm less than a maximum distance MDIS from the center portion CP may have a luminance of about 283 nit; the first pixel PX1 having a distance corresponding to about 1 mm less than the maximum distance MDIS from the center portion CP may have a luminance of about 282 nit; the first pixel PX1 having a distance corresponding to about 0.5 mm less than the maximum distance MDIS from the center portion CP may have a luminance of about 281 nit; and the first pixel PX1 having the maximum distance MDIS from the center portion CP may have a luminance of about 280 nit.

Further, as illustrated in FIG. 9, in a case where the ratio of the luminance of the edge portion EP to the luminance of the center portion CP is set to about 50%, the following may be true: the first pixel PX1 in the center portion CP may have a luminance of about 400 nit; the first pixel PX1 having the distance of about 0.5 mm from the center portion CP may have a luminance of about 398 nit; the first pixel PX1 having the distance of about 1 mm from the center portion CP may have a luminance of about 397 nit; the first pixel PX1 having the distance of about 1.5 mm from the center portion CP may have a luminance of about 395 nit; the first pixel PX1 having the distance corresponding to about 1.5 mm less than the maximum distance MDIS from the center portion CP may have a luminance of about 205 nit; the first pixel PX1 having the distance corresponding to about 1 mm less than the maximum distance MDIS from the center portion CP may have a luminance of about 203 nit; the first pixel PX1 having the distance corresponding to about 0.5 mm less than the maximum distance MDIS from the center portion CP may have a luminance of about 202 nit; and the first pixel PX1 having the maximum distance MDIS from the center portion CP may have a luminance of about 200 nit.

A data driver 130 may provide data signals DS to the display panel 110 based on the image data (or output image data ODAT) on which the edge-dimming-data-converting operation is performed, and the display panel 110 may display an image based on the data signals DS (S450).

FIG. 10 illustrates a first example 510 of a portion X of the display panel 110 of FIG. 8 in a first case where the edge-dimming operation is not performed, a second example 530 of the portion X of the display panel 110 of FIG. 8 in a second case where the edge-dimming operation is performed with the ratio of the luminance of the edge portion EP to the luminance of the center portion CP being about 70%, and a third example 550 of the portion X of the display panel 110 of FIG. 8 in a third case where the edge-dimming operation is performed with the ratio of the luminance of the edge portion EP to the luminance of the center portion CP being about 50%.

As illustrated in FIG. 10, in the first example 510 where the edge-dimming operation is not performed, an image displayed in the light transmission region LTR and an image around the light transmission region LTR may be distinguished by a user, and a boundary of the light transmission region LTR may be perceived. However, in the second example 530 where the edge-dimming operation is performed with the ratio of about 70%, the boundary of the light transmission region LTR may tend not to be perceived by the user. Further, in the third example 550 where the edge-dimming operation is performed with the ratio of about 50%, the boundary of the light transmission region LTR may be even less perceptible by the user.

Figure 11:
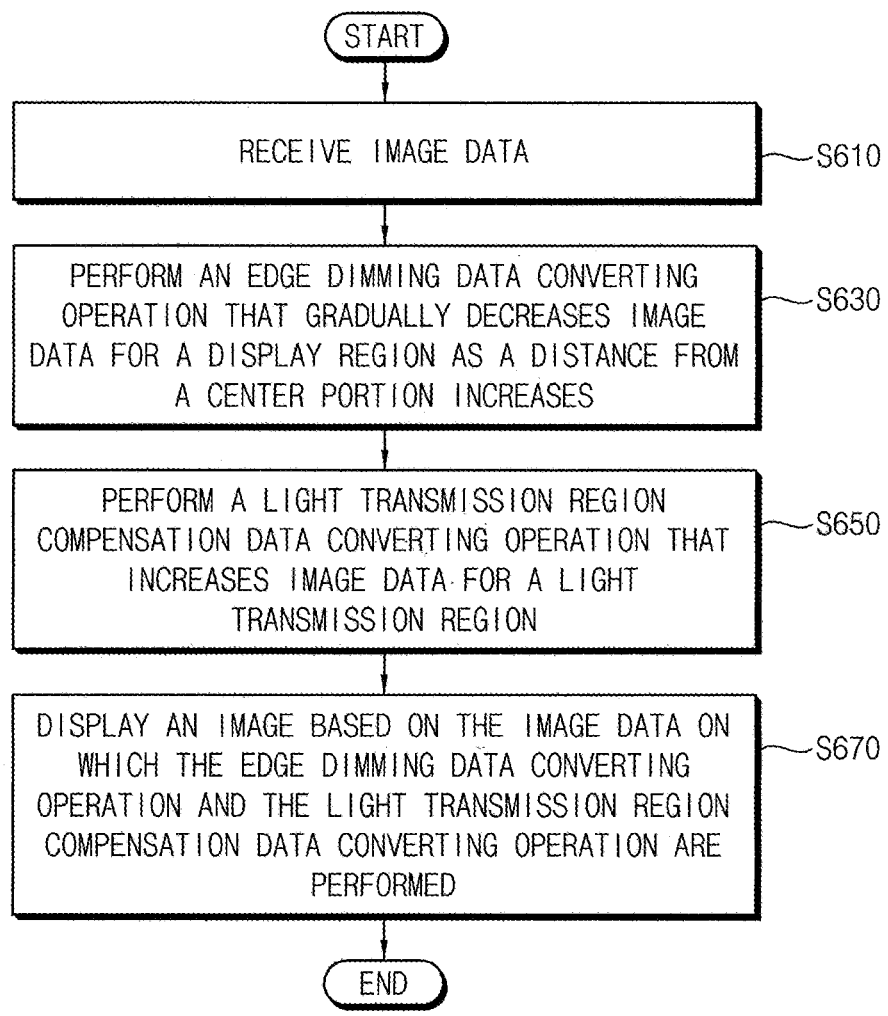
FIG. 11 is a flowchart illustrating a method of operating a display device according to some embodiments of the present disclosure.
Figure 12:
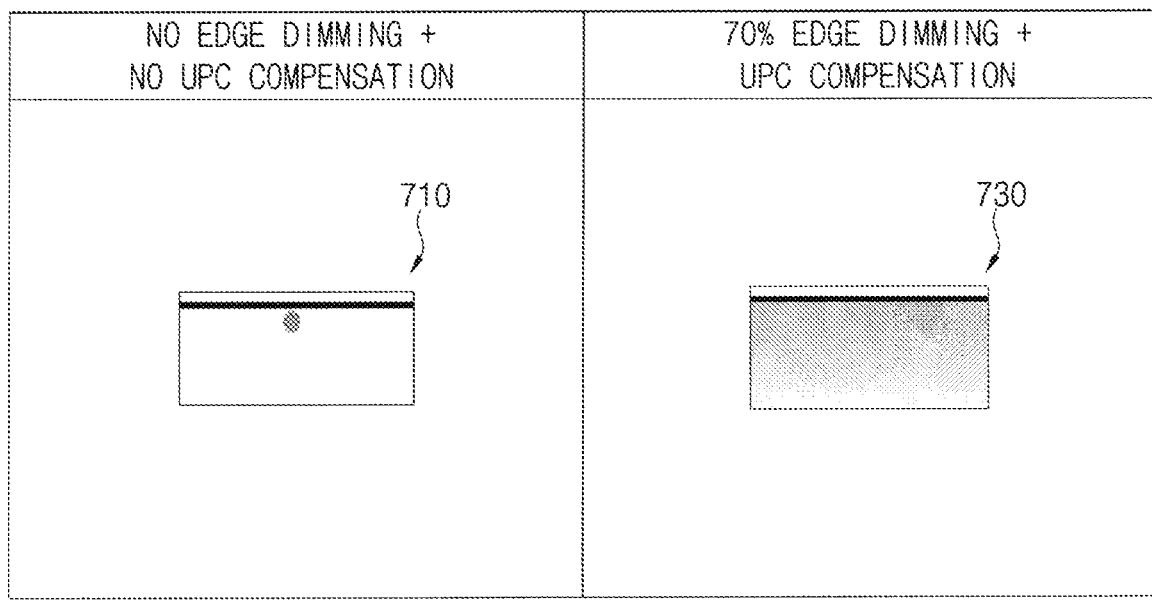
FIG. 12 is a diagram for describing an example of an X portion of a display panel of FIG. 8 in a method of operating a display device according to some embodiments of the present disclosure.

FIG. 11 is a flowchart illustrating a method of operating a display device according to some embodiments of the present disclosure, and FIG. 12 is a diagram for describing an example of an X portion of a display panel of FIG. 8 in a method of operating a display device according to some embodiments of the present disclosure.

Referring to FIGS. 1 and 11, a panel driver 120 may receive image data (or input image data IDAT) (S610), may perform an edge-dimming operation that gradually decreases a luminance of a display region DR other than a light transmission region LTR from a center portion CP of the display region DR to an edge portion EP of the display region DR (S630), and may further perform a light-transmission-region-compensation operation that increases the luminance of the light transmission region LTR (S650). For example, the panel driver 120 may perform an edge-dimming-data-converting operation that gradually decreases the image data for the display region DR other than the light transmission region LTR as a distance from the center portion CP increases (S630), and may perform a light-transmission-region-compensation-data-converting operation that increases the image data for the light transmission region LTR (S650).

A data driver 130 may provide data signals DS to the display panel 110 based on the image data (or output image data ODAT) on which the edge-dimming-data-converting operation and the light-transmission-region-compensation-data-converting operation are performed, and the display panel 110 may display an image based on the data signals DS (S670).

FIG. 12 illustrates a first example 710 of a portion X of the display panel 110 of FIG. 8 in a first case where the edge-dimming operation and the light-transmission-region-compensation operation are not performed. FIG. 12 also illustrates a second example 730 of the portion X of the display panel 110 of FIG. 8 in a second case where the edge-dimming operation with a ratio of a luminance of the edge portion EP to a luminance of the center portion CP being about 70%, and the light-transmission-region-compensation operation with a luminance-increasing rate of the light transmission region LTR being about 40%, are performed. As illustrated in FIG. 12, in the first example 710 where the edge-dimming operation and the light-transmission-region-compensation operation are not performed, an image displayed in the light transmission region LTR and an image around the light transmission region LTR may be distinguished by a user, and a boundary of the light transmission region LTR may be perceived. However, in the second example 730, where the edge-dimming operation with the ratio of about 70% is performed, and where the light-transmission-region-compensation operation with the luminance-increasing rate of about 40% is performed, perceptibility of the boundary of the light transmission region LTR by the user may be reduced or prevented.

To reduce or prevent perceptibility of the boundary of the light transmission region LTR, although FIG. 10 illustrates an example 550 where the edge-dimming operation is performed with the ratio of about 50%, and although FIG. 12 illustrates an example 730 where the edge-dimming operation with the ratio of about 70% and the light-transmission-region-compensation operation with the luminance-increasing rate of about 40% are performed, the ratio of the luminance of the edge portion EP to the luminance of the center portion CP, and/or the luminance-increasing rate of the light transmission region LTR, may be changed according to other embodiments of the present disclosure.

Figure 14:
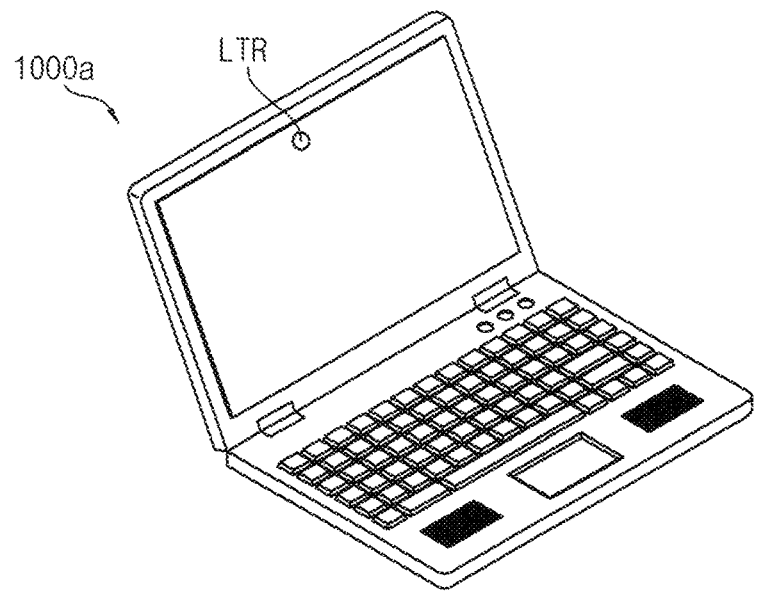
FIG. 14 is a diagram illustrating an example of an electronic device according to some embodiments of the present disclosure.
Figure 15:
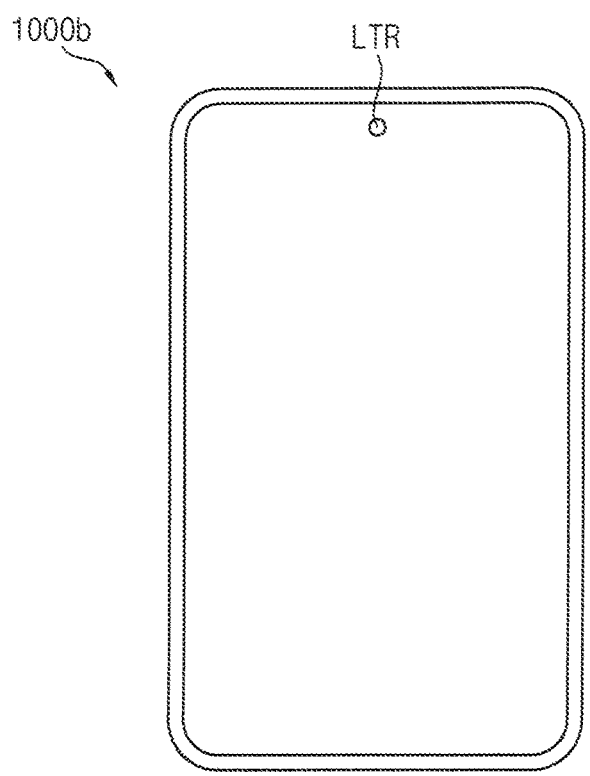
FIG. 15 is a diagram illustrating another example of an electronic device according to some embodiments of the present disclosure.

FIG. 13 is a block diagram illustrating an electronic device including a display device according to some embodiments of the present disclosure, FIG. 14 is a diagram illustrating an example of an electronic device according to some embodiments of the present disclosure, and FIG. 15 is a diagram illustrating another example of an electronic device according to some embodiments of the present disclosure.

Referring to FIG. 13, an electronic device 1000 according to some embodiments of the present disclosure may include a display device 1010 and an electronic element 1020. In some embodiments, the electronic device 1000 may further include a processor 1030, a memory device 1040, a storage device 1050, and an input/output (I/O) device 1060. The electronic device 1000 may further include a power supply for supplying power, and a plurality of ports for communicating with a video card, a sound card, a memory card, a universal serial bus (USB) device, other electric devices, etc.

The display device 1010 may include a display panel having a display region and including a light transmission region within an edge portion of the display region, and a panel driver that drives the display panel. The panel driver may perform an edge-dimming operation that gradually decreases a luminance of the display region other than the light transmission region from a center portion of the display region to the edge portion of the display region while not reducing a luminance of the light transmission region. The light transmission region for the electronic element 1020 may be located within the display region, and thus a screen ratio, or a screen-to-body ratio (STBR) of the display panel may be improved. Further, because the edge-dimming operation is performed, power consumption of the display device 1010 may be reduced, and a boundary of the light transmission region may not be perceived.

The electronic element 1020 may be located to overlap the light transmission region. In some embodiments, the electronic element 1020 may be a camera module. The camera module may be located under the display panel to overlap the light transmission region, and the camera module may be referred to as a under panel camera (UPC). The camera module may capture an external image through the light transmission region. In other embodiments, the electronic element 1020 may be a sensor module, such as a face recognition sensor module, a proximity sensor module, a motion sensor module, etc. The sensor module may be located under the display panel to overlap the light transmission region, and the sensor module may be referred to as a under panel sensor (UPS). The senor module may sense the external light transmitted through the light transmission region LTR.

The processor 1030 may perform various computing functions or tasks. The processor 1030 may be an application processor (AP), a microprocessor, a central processing unit (CPU), etc. The processor 1030 may be coupled to other components via an address bus, a control bus, a data bus, etc. Further, in some embodiments, the processor 1030 may be further coupled to an extended bus such as a peripheral component interconnection (PCI) bus.

The memory device 1040 may store data for operations of the electronic device 1000. For example, the memory device 1040 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1050 may be a solid state drive (SSD) device, a hard disk drive (HDD) device, a CD-ROM device, etc. The I/O device 1060 may be an input device such as a keyboard, a keypad, a mouse, a touch screen, etc., and an output device such as a printer, a speaker, etc.

In some embodiments, as illustrated in FIG. 14, the electronic device 1000 may be a laptop computer 1000*a*. The laptop computer 1000*a* may include a light transmission region LTR within an edge portion of a display region. In other embodiments, as illustrated in FIG. 15, the electronic device 1000 may be a smart phone 1000*b*. The smart phone 1000*b* may include a light transmission region LTR within an edge portion of a display region. In still other embodiments, the electronic device 1000 may be any electronic device including the display device 1010, such as a tablet computer, a mobile phone, a digital television, a 3D television, a personal computer (PC), a home appliance, a cellular phone, a wearable device, a personal digital assistant (PDA), a portable multimedia player (PMP), a digital camera, a music player, a portable game console, a navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims, with functional equivalents thereof to be include therein.

What is claimed is:

1. A display device comprising:
    a display panel having a display region, and comprising a light transmission region overlapping an electronic element within an edge portion of the display region; and
    a panel driver configured to drive the display panel, and configured to perform an edge-dimming operation that gradually decreases a luminance of an area of the display region excluding the light transmission region from a center portion of the display region to the edge portion of the display region while not decreasing a luminance of the light transmission region by:
        gradually decreasing gray levels of image data for the area of the display region as a distance from the center portion increases, and
        either maintaining image data for the light transmission region or increasing the luminance of the light transmission region,
    wherein the area of the display region excluding the light transmission region comprises first pixels, and
    wherein the light transmission region comprises second pixels comprising
        a light-transmitting area corresponding to the electronic element.

2. The display device of claim 1, wherein the panel driver comprises an edge-dimming-data converter configured to gradually decrease gray levels of image data for the area of the display region as a distance from the center portion increases, and configured to maintain image data for the light transmission region.

3. The display device of claim 2, wherein the panel driver further comprises
    an edge-dimming-parameter storage configured to store an edge-dimming-luminance parameter representing a ratio of a luminance of the edge portion to a luminance of the center portion, and
    wherein the edge-dimming-data converter is configured to decrease the gray levels of the image data based on the edge-dimming-luminance parameter stored in the edge-dimming-parameter storage.

4. The display device of claim 3, wherein the edge-dimming-luminance parameter stored in the edge-dimming-parameter storage is configured to be changed by a user setting.

5. The display device of claim 1, wherein the panel driver is further configured to perform a light-transmission-region-compensation operation to increase the luminance of the light transmission region.

6. The display device of claim 5, wherein the panel driver comprises an edge-dimming-data converter configured to gradually decrease gray levels of image data for the area of the display region as a distance from the center portion increases, and to increase gray levels of image data for the light transmission region.

7. The display device of claim 6, wherein the panel driver further comprises an edge-dimming-parameter storage configured to store an edge-dimming-luminance parameter representing a ratio of a luminance of the edge portion to a luminance of the center portion, and configured to store a light-transmission-region-compensation parameter representing a luminance-increasing rate of the light transmission region, and
    wherein the edge-dimming-data converter is configured to decrease the gray levels of the image data for the area of the display region based on the edge-dimming-luminance parameter, and is configured to increase the gray levels of the image data for the light transmission region based on the light-transmission-region-compensation parameter.

8. The display device of claim 7, wherein the edge-dimming-luminance parameter and the light-transmission-region-compensation parameter are configured to be changed by a user setting.

9. The display device of claim 1, wherein a resolution of the light transmission region is equal to a resolution of the area of the display region.

10. The display device of claim 1, wherein each of the first pixels comprises first light-emitting regions configured to emit lights having different colors,
    wherein each of the second pixels comprises second light-emitting regions configured to emit lights having the different colors, and
    wherein the light-transmitting area is configured to transmit external light such that the external light reaches the electronic element.

11. The display device of claim 10, wherein a size of the second light-emitting regions is smaller than a size of the first light-emitting regions.

12. The display device of claim 1, wherein a resolution of the light transmission region is less than a resolution of the area of the display region.

13. The display device of claim 1, wherein N first pixels are in the area of the display region, N being an integer that is greater than 0, and
    wherein M second pixels are in the area of the light transmission region, M being an integer that is greater than 0 and less than N.

14. The display device of claim 13, further comprising a light-transmitting area for transmitting external light in the light transmission region such that the external light reaches the electronic element.

15. The display device of claim 13, wherein the first pixels and the second pixels are arranged in an RGBG structure.

16. An electronic device comprising:
    a display device comprising a display panel having a display region and a light transmission region within an edge portion of the display region, and a panel driver configured to drive the display panel; and
    an electronic element overlapping the light transmission region, wherein the panel driver is configured to perform an edge-dimming operation that gradually decreases a luminance of an area of the display region from a center portion of the display region to the edge portion of the display region while maintaining a luminance of the light transmission region by:
- gradually decreasing gray levels of image data for the area of the display region as a distance from the center portion increases, and
- either maintaining image data for the light transmission region or increasing the luminance of the light transmission region, wherein the area of the display region excluding the light transmission region comprises first pixels, and wherein the light transmission region comprises second pixels, each of the second pixels comprising a light-transmitting area corresponding to the electronic element.

17. The electronic device of claim 16, wherein the electronic element comprises a camera module.

18. The electronic device of claim 16, wherein the electronic element comprises a face recognition sensor module, a proximity sensor module, or a motion sensor module.

19. The electronic device of claim 16, wherein the electronic device comprises a laptop computer.

20. The electronic device of claim 16, wherein the electronic device comprises a smart phone or a tablet computer.

* * * * *